(12) United States Patent
Adamson et al.

(10) Patent No.: US 9,400,826 B2
(45) Date of Patent: Jul. 26, 2016

(54) METHOD AND SYSTEM FOR AGGREGATE CONTENT MODELING

(71) Applicant: OUTSIDE INTELLIGENCE, INC., Toronto (CA)

(72) Inventors: Daniel Ryan Adamson, Toronto (CA); Victor Fernandovich Comas Lijachev, Toronto (CA)

(73) Assignee: Outside Intelligence, Inc., Toronto, Ontario (CA)

( * ) Notice: Subject to any disclaimer, the term of this patent is extended or adjusted under 35 U.S.C. 154(b) by 287 days.

(21) Appl. No.: 13/926,623

(22) Filed: Jun. 25, 2013

(65) Prior Publication Data

US 2014/0379761 A1 Dec. 25, 2014

(51) Int. Cl.
*G06F 17/30* (2006.01)

(52) U.S. Cl.
CPC .... *G06F 17/30563* (2013.01); *G06F 17/30076* (2013.01); *G06F 17/30569* (2013.01)

(58) Field of Classification Search
USPC ........................................ 707/809–811, 803
See application file for complete search history.

(56) References Cited

U.S. PATENT DOCUMENTS

| | | | | |
|---|---|---|---|---|
| 5,778,359 A * | 7/1998 | Stent | ............................. | 712/300 |
| 7,225,183 B2 * | 5/2007 | Gardner | | |
| 7,424,701 B2 * | 9/2008 | Kendall et al. | ................ | 717/105 |
| 7,475,084 B2 * | 1/2009 | Edelstein et al. | | |
| 7,647,349 B2 * | 1/2010 | Hubert et al. | .......... | 707/999.107 |
| 7,693,900 B2 * | 4/2010 | Wilmering et al. | ........... | 707/713 |
| 7,770,181 B2 * | 8/2010 | Snover et al. | ................. | 719/315 |
| 9,092,802 B1 * | 7/2015 | Akella | ............... | G06Q 30/0256 |
| 2002/0189427 A1 * | 12/2002 | Pachet | ............................ | 84/609 |
| 2004/0117346 A1 * | 6/2004 | Stoffel et al. | ..................... | 707/1 |
| 2004/0216030 A1 * | 10/2004 | Hellman et al. | ............. | 715/500 |
| 2008/0172360 A1 * | 7/2008 | Lim et al. | .......................... | 707/3 |
| 2008/0215542 A1 * | 9/2008 | Lim et al. | .......................... | 707/3 |
| 2013/0232157 A1 * | 9/2013 | Kamel | ............... | G06F 17/3028 707/755 |

* cited by examiner

*Primary Examiner* — Cam-Linh Nguyen

(74) *Attorney, Agent, or Firm* — Anil Bhole; Bhole IP Law

(57) ABSTRACT

A method for content extraction and modeling by a computer system for incorporating the content into a domain model including the steps of extracting by an acquisition module content stored on a computer readable medium of at least one data source, determining whether the content is structured or unstructured; wherein structured content has a first content model associated therewith defining at least a format of the structured content and unstructured content has no model associated therewith. Upon a condition in which the content is structured, incorporating the structured content into the domain model; and, upon a condition in which the content is unstructured, determining by the computer system a second content model to transform the unstructured content into newly structured content and incorporating the newly structured content into the domain model.

31 Claims, 8 Drawing Sheets

| | Company | 🛍 |
|---|---|---|
| | Summary | |
| | Financials | |
| 5 | Claims History | |
| 1 | Government Watchlists | ① |
| 2 | Legal Filings | ② |
| 3 | Safety Inspections/Violations | ③ |
| 4 | Product Recalls | ④ |
| 12 | Milestones | ⑤ |
| 4 | Associations | |
| 3 | Classifications | |
| | Images | |
| | Family Tree | |
| 2 | User Comments | |
| 14 | Reviews | ⑤ |
| 23 | News | ④ |
| 8 | Blogs | ② |
| 154 | Web | ⑰ |
| > | Location | 📋 |
| > | People | 👤 |

Alerts
① Government Watchlists
② Legal Filings
③ Safety Inspections / Violations
④ Product Recalls
⑤ Flagged Content

Links
bonjourbrioche.com
samplewebsite.com
bakeryworld.com
wheretoeat.ca

Profile
Also know as: Bonjour B
Number of employees: 30
Last years sales: $130,000
Credit score:

Stock tickets: NYSE: BBL
Legal status: Limited Corporation
Year founded: 1996
5800

| Source: | Data: | Trust: |
|---|---|---|
| Forbes.com | $140,000 | |
| FinanceWorkl.com | $150,000 | |
| Wikipedia | $100,000 | |
| Average: | $130,000 | |

Description
Lorem ipsum dolor sit amet, Vivamus porttitor fermentun amet, ullamcorper et purus. quis lectus, Integer auctor adipiscing pulvinar.

ongue.
lacerat sit
am, blandit

FIG. 7

METHOD AND SYSTEM FOR AGGREGATE CONTENT MODELING

FIELD OF THE INVENTION

The present invention relates generally to information extraction and modeling. More particularly, the present invention relates to a method and system for determining and verifying relationships of information from varying sources.

BACKGROUND OF THE INVENTION

Data cleansing and gathering software is well known. Applications such as person merging software, can determine household statistics from lists of names and other information as well as merging persons with different name variations who are in fact the same person. Such applications can also be applied to business and company information. Various internet websites also attempt to collect information from a number of different websites to present gathered data. However, these sources are typically used in the general context and for vague informational purposes only as the relevance and accuracy of the gathered information are not considered beyond a superficial level.

With an increase in the volume of information that can be obtained as well as an increase in the variation of the sources from which such content can be obtained, there is an increase in the need for such content to be normalized. Such sources can include newspapers, magazines, blogs, social media, etc. Because information from these sources can be incomplete and inconsistent, the need for determining the relevance of content to specific contexts becomes imperative. There is also a need to determine when content can be merged.

It is an object of this invention to provide a novel method and system for content extraction and association.

SUMMARY OF THE INVENTION

According to one embodiment of the invention, there is provided a method for content extraction and modeling by a computer system for incorporating the content into a domain model including extracting by an acquisition module content stored on a computer readable medium of at least one data source; determining whether the content is structured or unstructured; wherein structured content has a first content model associated therewith defining at least a format of the structured content and unstructured content has no model associated therewith; upon a condition in which the content is structured, incorporating the structured content into the domain model; and, upon a condition in which the content is unstructured, determining by the computer system a second content model to transform the unstructured content into newly structured content and incorporating the newly structured content into the domain model.

According to one aspect of this embodiment, the method further includes storing by the computer system the second content model; extracting by the acquisition module additional content; determining whether the additional content is structured or unstructured; upon a condition in which the additional content is unstructured, determining whether the unstructured additional content can be structured by the second content model; upon a condition in which the unstructured additional content can be structured by the second content model, incorporating the additional content into the domain model.

According to another aspect of this embodiment, the method further includes repeating each of the steps until an extracted content limit has been reached.

According to another aspect of this embodiment incorporating into the domain model comprises applying a transform to one or both of the first content model and the second content model.

According to another aspect of this embodiment incorporating into the domain model comprises applying a transform to the second content model such that the second content model can be incorporated into the first content model and subsequently applying a second transform to the first content model to incorporate the first content model into the domain model.

According to another aspect of this embodiment, the method further includes prior to the incorporating into the domain model steps determining whether the extracted content is relevant to the domain, wherein the domain defines a context in which the content has meaning; upon determining that the extracted content is relevant, proceeding with the incorporating; upon determining that the extracted content is not relevant, extracting additional content.

According to another aspect of this embodiment, the method further includes upon being unable to determine whether the extracted content is relevant, storing on a computer readable medium the extracted content for further analysis.

According to another aspect of this embodiment, the determining whether the extracted content is relevant includes determining, the degree of association via a definition of equality that compares the extracted content with known content in the domain model; and an association of the extracted content with the known content in the domain model.

According to another aspect of this embodiment, the determining an equality includes determining a similarity measure and identifying a minimum score of the similarity measure required to identify the equality.

According to another aspect of this embodiment, the extracted content includes a document, and the similarity measure is determined based on the document as a whole.

According to another aspect of this embodiment, the determining an equality of extracted content includes determining an equality of the content model with at least a portion of the domain model.

According to another aspect of this embodiment, the determining an association includes identifying at least a portion of the content model which can be incorporated into the domain model.

According to a second embodiment of the invention, there is provided a system for content extraction and modeling for incorporating the content into a domain model including an acquisition module implemented on the computer system for extracting content stored on a computer readable medium of at least one data source; a discovery module implemented on the computer system for determining whether the content is structured or unstructured; wherein structured content has a first content model associated therewith defining at least a format of the structured content and unstructured content has no model associated therewith; upon a condition in which the content is structured, transforming the structure content and incorporating into the domain model or directly incorporating the structured content into the domain model; and, upon a condition in which the content is unstructured, determining by the computer system a second content model to transform the unstructured content into newly structured content and incorporating the newly structured content into the domain model.

According to one aspect of this embodiment, the system further includes a computer system having a computer readable medium for storing the second content model; the acquisition module including computer executable instructions for extracting additional content; the discovery module including computer executable instructions for determining whether the additional content is structured or unstructured; upon a condition in which the additional content is unstructured, the discovery module determining whether the unstructured additional content can be structured by the second content model; upon a condition in which the unstructured additional content can be structured by the second content model, the discovery module incorporating the additional content into the domain model.

According to another aspect of this embodiment, there is provided computer executable instructions on the computer system for repeating each of the steps until an extracted content limit has been reached.

According to another aspect of this embodiment, the incorporating into the domain model comprises applying a transform to one or both of the first content model and the second content model.

According to another aspect of this embodiment, the incorporating into the domain model comprises applying a transform to the second content model such that the second content model can be incorporated into the first content model and subsequently applying a second transform to the first content model to incorporate the first content model into the domain model.

According to another aspect of this embodiment, there is provided computer executable instructions on the computer system for determining prior to the incorporating into the domain model whether the extracted content is relevant to the domain, wherein the domain defines a context in which the content has meaning; upon determining that the extracted content is relevant, proceeding with the incorporating; upon determining that the extracted content is not relevant, extracting additional content.

According to another aspect of this embodiment, upon being unable to determine whether the extracted content is relevant, storing on a computer readable medium the extracted content for further analysis.

According to another aspect of this embodiment, there is provided the determining whether the extracted content is relevant includes determining by the computer system, one of an equality of the extracted content with known content in the domain model; and an association of the extracted content with the known content in the domain model.

According to another aspect of this embodiment, the determining an equality includes determining a similarity measure and identifying a minimum score of the similarity measure required to identify the equality.

According to another aspect of this embodiment, the extracted content includes a document, and the similarity measure is determined based on the document as a whole.

According to another aspect of this embodiment, the determining an equality of extracted content includes determining an equality of the content model with at least a portion of the domain model.

According to another aspect of this embodiment, the determining an association includes identifying at least a portion of the content model which can be incorporated into the domain model.

BRIEF DESCRIPTION OF THE DRAWINGS

An embodiment will now be described, by way of example only, with reference to the attached Figures, wherein:

FIG. 7 a screenshot of an application using the system of FIG. 2 and the method of FIG. 3.

DETAILED DESCRIPTION OF THE EMBODIMENT

Figure 1:
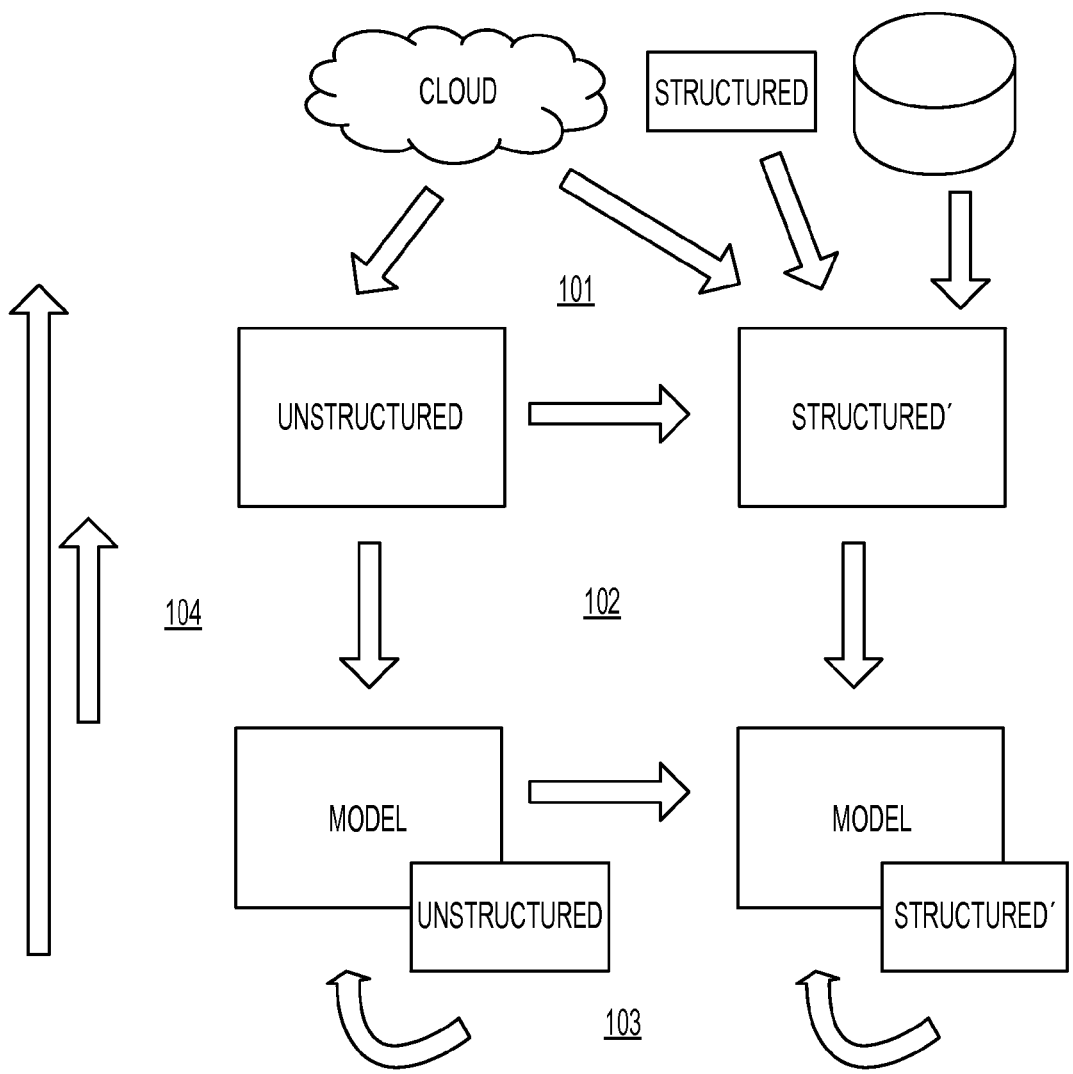
FIG. 1 shows a high-level architecture of a system for acquiring content and applying translation to the content.

While the Background of Invention described above has identified particular problems known in the prior art, the present invention provides, in part, a new and useful application for data extraction and gathering systems that extend beyond those prior art systems dependent entirely on the source of the information for consistency of data and usefulness of same. That is, while general data gathering is well known, and certain prior art achievements have been made in presenting such information and providing for drilling down of information, these systems are widely dependent on the source of the information itself, or alternatively on a well-defined and known interaction between the source of information and the data gathering or presentation tool.

The present invention aims to answer some of the following questions while providing a method and system that generalizes the data discovery, extraction and association of potentially large amounts of data from known and unknown sources. While many advantages of the invention, new applications of data gathering technology and possible uses are identified, nothing in this description should be taken as a promise that each and every advantage, application or benefit of the invention is required to establish the utility of the invention. The claims that follow this description provide a minimum level of utility in claiming an invention that provides for the extraction and association of data.

Consider the situation of a newspaper article that mentions one person, and there is knowledge of a person with the same name. Is that sufficient to say that the article is about that person? Most useful applications would consider that insufficient information to be certain. However, are there other pieces of information that can add to the certainty of associating that person with the news article? For example, the article may discuss a neighborhood, and that person is known to work in that neighborhood. The certainty of the article being 'about' that person then significantly increases, but by how much? This could be useful for example, in carrying out preliminary background diligence prior to hiring a new employee.

In another scenario about people, in the specific domain of healthcare, there is a tremendous challenge of determining if people are the same individuals. For example, people may move or may not have accurate health identifiers. Can other information, such as the health records that have been coded for a list of patient visits, be used to determine with significance that two people are in fact the same individual? Such an analysis will likely involve basic profile information (name, address, birthdate) as well as potentially unstructured data, such as a discharge report. Complicating this problem is the reality that such information is often incomplete and noisy. Going a step further, if a patient's data has been merged, aggregated and normalized, can we use the same approach to determine inconsistencies? These may present for the advantage of the patient where the omission of potentially dangerous data is discovered. This can also act as an indication that the data has been abnormally merged or a source is incorrect or noisy?

This problem also extends beyond the recognition of people. For example, is one company actually related to another company, or in fact the same company? Is a news article that mentions a lawsuit against a company the same as a company whose name matches one in a local database? Perhaps, but can additional known "features" be used to ascertain this certainty? We can do similar exercises for other representations that involve either simple or complicated data models. Another use-case involves the detection of fraud, which may only be uncovered through the detection of relationships between companies and common individuals.

When searching for information in the web we are regularly dealing with an increasing volume of text documents with huge numbers of information sources such as newspapers, blogs, social media, etc. It is then quite hard to find content that are associated, for example, get information related only to a given company or person. Besides the problems concerning the amount of sources and text that need to be crawled, determining the information which is relevant to the specific context is of imperative importance.

What is described below is a method and apparatus for the determination of when structured data can be merged, as well as unstructured data, and various advanced capabilities, including the detection of inconsistencies.

In addition, it is often a requirement to understand the uncertainty behind associations, as well as a "best-fit" view of entity or understanding of trust attributed to certain data. The approach described below, can aid in the assessment of associated content, and can have tremendous impact on relevancy, ranking, establishment of trust, as well as analytic problems such as in predictive modeling. Some of these areas, as they relate to the invention, are also discussed.

The first step along the road in addressing some of these newly identified problems in information gathering is to develop a suitable reference model to which unrelated, or unassociated, data can be given context in a specific domain.

For the purposes of this application, the invention provides for a method and system that also makes use of machine learning technologies to assess information, or to complete due diligence within a specific context, or domain. Each domain has a domain model associated with it that may be user defined, or specified to include a number of types of information or groups of data that are relevant to the domain. A plurality of content models are defined, or derived, that may be transformed to associate content in the content models with the domain model. Content models may also be viewed as generic identifiers within the domain. Finally, particular pieces of content which may be unique data fields, sets of data or entire documents are defined to be instances of the content models. These definitions will become clearer as examples are provided throughout this description. The invention identifies ways of handling pieces of content that fit a known content model, content that fits an unknown or yet to be determined content model and content that does not or is unable to fit a content model. Furthermore, the invention provides for mechanisms for handling content models that can be transformed to communicate with the domain model and for content models that cannot be transformed to communicate with the domain model. These definitions are shown schematically in FIG. 1. A general system is shown for acquiring 101, associating 102, incorporating 103 and adapting 104 content from various sources in respect of a specific domain. As illustrated, the various sources may include information stored in a data cloud 110, a computer database 120 or a structured computer data file 130. Various other sources are also contemplated. As illustrated, extracted data may be structured or unstructured. Unstructured data may become structured data that could be made to fit a context model (not shown), and structure data may be transformed to a different structure for the purposes of fitting a context model. Finally, context models can be transformed to be consistent with each other, and the knowledge and definition of these models stored in a computer system carrying out the invention, so that the models are adopted by the system for extracting further data.

Figure 2:
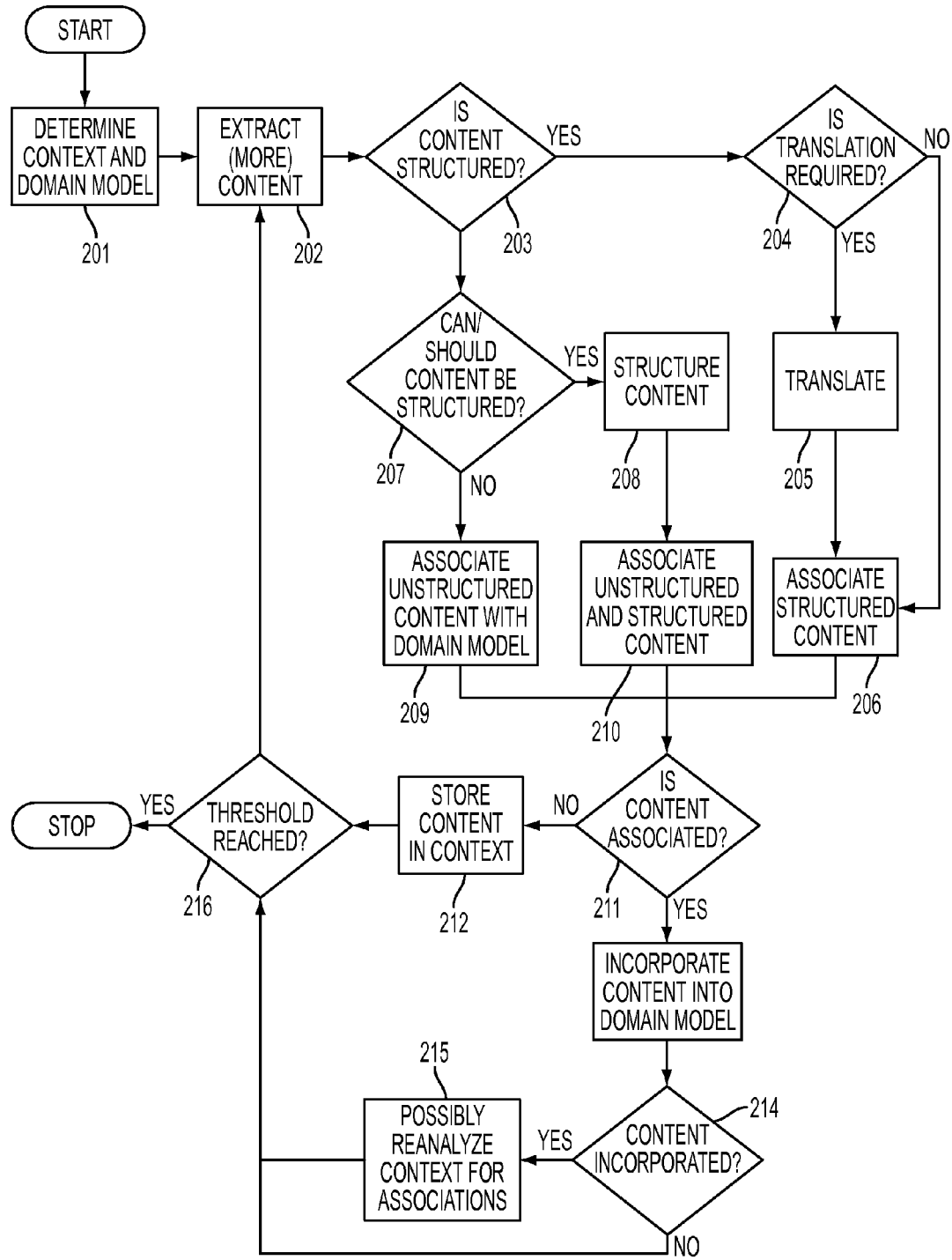
FIG. 2 shows a flow diagram of the method of acquiring, translating, and associating information to an entity.

Referring now to FIG. 2, there is shown an embodiment of the invention, where at step 201 a domain model is determined. In a basic example, the domain model could be one that reflects information about a particular person, such as the person's name, age, address, occupation, etc. At step 202, content is extracted by an acquisition module from any possible source. The extracted content is then analyzed by the acquisition module, or by another module implemented in software to determine whether the content is structured or unstructured, at step 203. Upon a condition in which the content is determined to be structure, the optional step of determining whether translation of the content is required 204. The already structure content is then associated with a content model at step 206, either with or without translation.

Upon a condition in which the content is unstructured, a determination is made at step 207 as to whether the content can or should be structured. If the content can or should be structured, a content structuring module structures the content at step 208, and associates the newly structured content with a particular content model at step 210. If the content cannot be structured, the unstructured content is stored in memory at the domain model at step 209. Content that has been associated is then incorporated into the domain model at step 213, and optionally reanalyzed for additional content associations at step 215. These steps are generally iterative, until a threshold of data acquisition is reached and the process stopped. Where new content models are derived at step 208, the acquisition of new content that fits these new content models can then be determined to be structured content making use of the known content models during the next iteration of the above-described process. While this describes the system and method at a high level, various specific steps will be described and example details of implementation will be described in more detail below.

The entity model 22 with the newly incorporated content is then used as feedback in an adaptation process 28. During this adaptation process 28, the system 10 determines what additional content to analyze and prioritize for the current entity model 22 and domain. Previously incorporated content that is already populating the entity model 22 is re-analyzed and re-prioritized with respect to the newly added content 16, 18 as well during the adaptation process 28. The updated entity model 22 will then be applied for future acquisition, association, incorporation, and adaptation processes. Various steps in the process will be described independently below.

Figure 3:
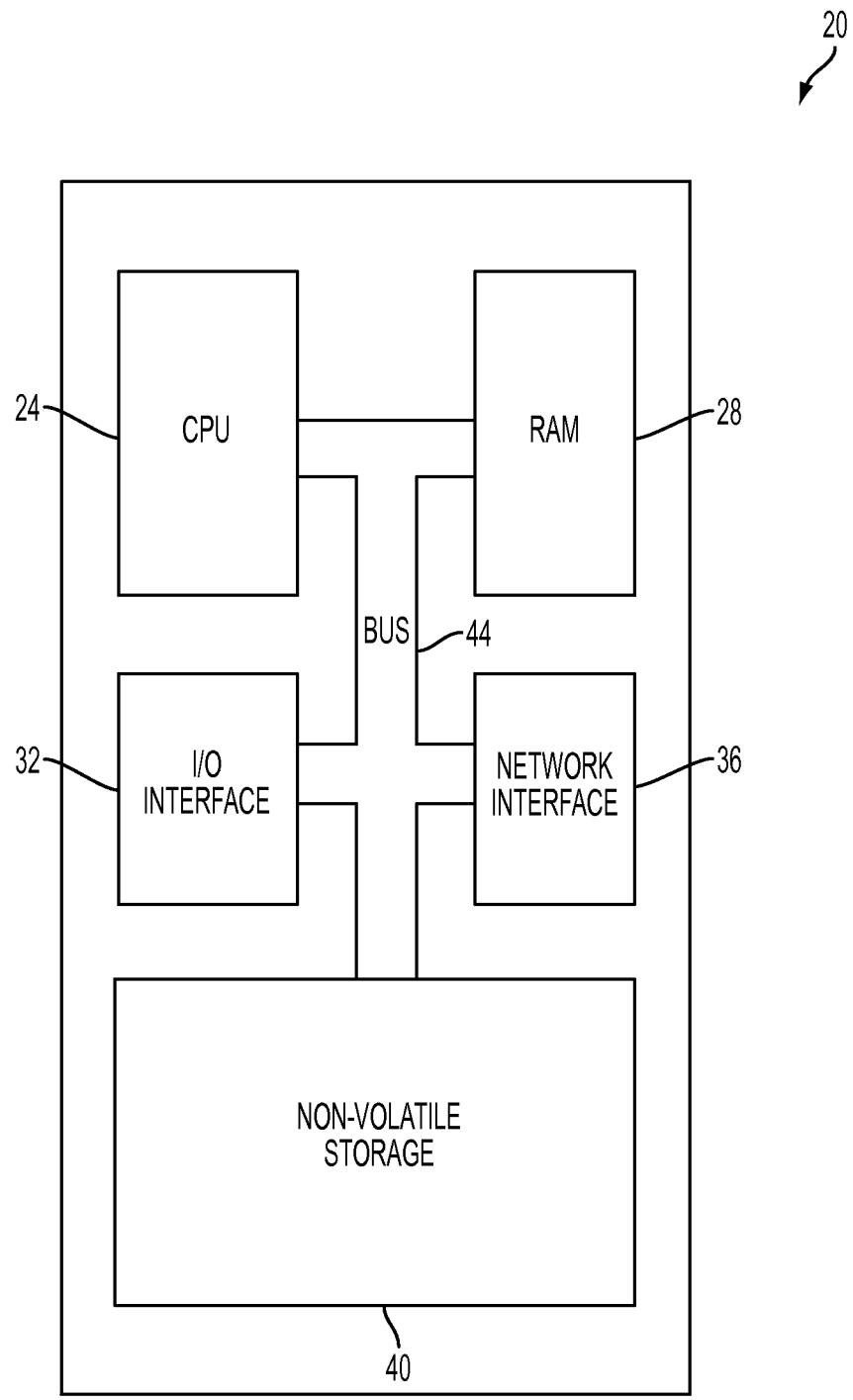
FIG. 3 shows a schematic of a computer system that may be used to implement various parts of the invention.
Figure 4:
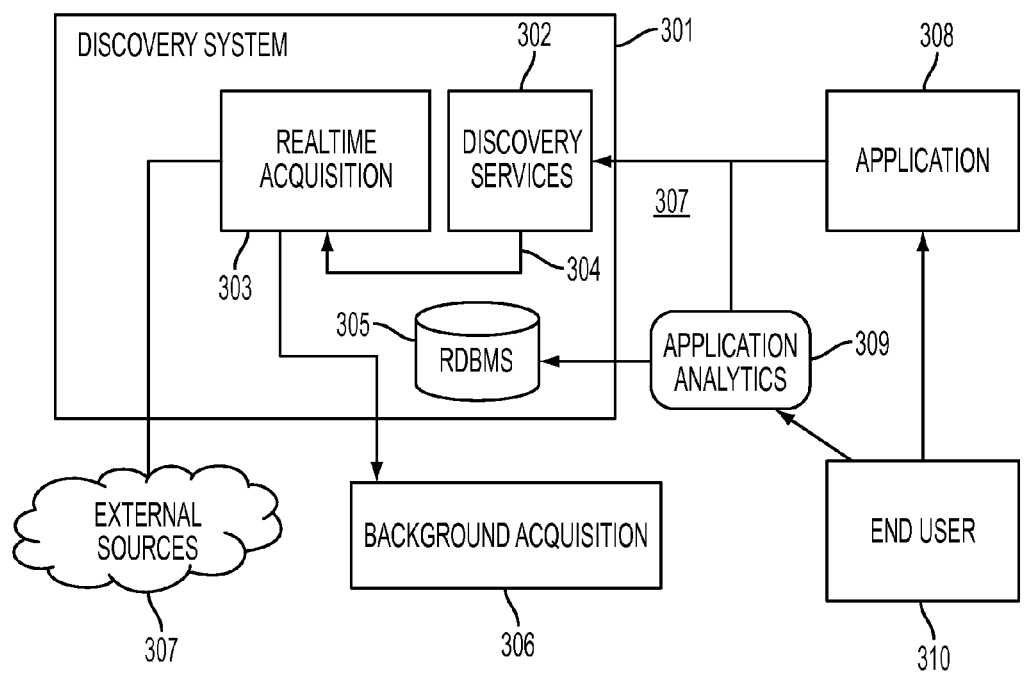
FIG. 4 shows a computer system according to one embodiment of the invention.

FIGS. 3 and 4 show a schematic diagram of a system 10 that may be used to implement the invention of FIGS. 1 and 2. An acquisition module 300 executing on a computer system includes a discovery service 302 called by users of the system to initiate a domain model, or to insert, delete, search, modify or retrieve existing domain models. An acquisition module 300 retrieves or extracts content from external sources 307 to be assembled into the domain model. Acquisition module 300 also includes a realtime acquisition processor 303 which retrieves and reads content to assemble content models 22 (of FIG. 1). The discovery services 302 and realtime acquisition processor 36 communicate through messaging infrastructure 304 to pass content to one another.

The realtime acquisition processor 303 may also retrieve content to be analyzed from background acquisition processor 306, which collect content from various external sources 307 and performs background analytics on the content to weed out content that cannot be handled by the realtime acquisition processor 303. For example, content may be time-sensitive and impractical to extract or analyzed by the realtime acquisition processor 303 because of its temporal nature. In this case, the background acquisition processor 306 can recognize this kind of content and not send it to the realtime acquisition processor 303.

A user interface 308 is utilized by an end user to call the acquisition module 301. The user interface 308 can call the acquisition module through a submission request, by creating a new entity model, or a request to retrieve results of an analysis.

FIG. 3 shows a computer system which may be used to implement the architecture described above, includes a number of physical and logical components, including a central processing unit ("CPU") 24, random access memory ("RAM") 28, an input/output ("I/O") interface 32, a network interface 36, non-volatile storage 4, and a local bus 44 enabling the CPU 24 to communicate with the other components. The CPU 24 executes an operating system, and a number of software systems and/or software modules. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other elements of the invention described herein as being in networked communication with each other. Non-volatile storage 4 stores the operating system and programs. During operation of the computer system, the operating system, the programs and the data may be retrieved from the non-volatile storage 4 and placed in RAM 28 to facilitate execution.

Extraction and Translation

The initial extraction process may begin by creating queries from the domain model based on user defined attributes in the model definition (for example, the CompanyLiability "name" attribute and "alternativeNames" attribute). Alternatively, the background analytics portion of the analysis (see 3.5 below) can determine relatively unique fields that may be good query fields, combined with feedback from matching results (for example, an internal identify will not return matching content from external sources). That is, a query on a known entity in a known content model is carried out. In the most basic example, this could be a query on a person's name and any known aliases.

Previously analyzed content may also be queried and/or otherwise retrieved for analysis. After the content is retrieved, several translation approaches on that content are possible including the following:

1. No translation or generic translation is performed. ie. the content is already in a domain model format the system recognizes.

2. Manually defined translation rules are applied, with the new content inserted into a domain model.

3. Automatically generated translation rules are applied, with the new content inserted into a domain model.

4. Extraction of content using NLP (natural language processing) is performed and inserted into a domain model.

5. Some combination of the above approaches are used (for example, 3 and 4 above) to translate the content into a domain model.

In more sophisticated approaches, the system determines the appropriate methodology for translating the content, if necessary. The approaches to translation may involve an understanding and processing of data that includes similar analytics to those defined below. A system may in fact use a common set of analyzers when making assessments for translation in addition to associate analytics. Translation methods may also include those already known in the prior art to make extracted data semantically consistent with the content model to which it relates.

Various other data extraction methods are also contemplated, but the invention goes one step further than prior art methods in that a determination is made as to whether the extracted content is structure or unstructured, either before or after translation.

Association

In the association step, the content is assessed to determine if the content is relevant to the entity and domain being analyzed. The association step involves associating extracted data with a known entity model, developing a new entity model, or in some cases, associating unstructured data with the domain model. Once the content model has been determined, the relevance of the content can be determined. In some instances, extracted data may also be semi-structured or structured in a manner that does not permit association with a particular entity model. The association process herein described addresses each of these scenarios in turn in finding an association between particular pieces of extracted data and related content models, and from the content models to the domain model.

Consider the generalized case in which there exists a model instance, $M_A$, of type $T_1$ and a determination is to be made whether a particular piece or group of extracted content should be incorporated into the content model $M_A$. $M_A$ may have been obtained from a specific data source $D_A$, or it may be an aggregate model consisting of a combination of sources, the structure of which is known in the form of a prior content model, for example. In either case, the process will be similar to integrate a content model $M_B$ of type $T_2$ extracted from another data source $D_B$. This step can be repeated until all content models $M_A \ldots M_i$.

First, if the type of $M_A$ is not the same as the type of $M_B$, it must be determined if we can define a type transformation $(T_2 \rightarrow T_1)$ such that $M_B$ is transformed into $M_B'$ which is of the same type of $M_A$ or vice-versa, or introduce a type transformation, $T_3$ with transforms defined for $T_1$ and $T_2$ which both can be transformed to $T_3$.

Note that the transformation process may involve multiple steps, involving sequential translations or transformations in order to arrive at a model type that be incorporated into the domain model, if appropriate.

If there is no set of transforms available that allow for the translation to a common model type, the association approach can still occur, however, this case and the process is discussed below, where generally, the association occurs directly with the domain model to store the extracted content for future analysis as more data or content model types becomes available.

For example, suppose there is a subset of model types which are potentially derived from each other. For example, consider different data sources of structured data having a "Person" model type and a "CustomerPerson" model type representing a company's internal representation of a person who is a customer. In this case, it is possible to declaratively define a transform that creates a Person from a CustomerPerson instance. It is also possible to define an evaluation to determine whether two people instances are in fact the same. Using the translation or transformation and equality checks, if the models are not equal, the platform can then be configured to either create a new model for the new content, or to simply discard the new content as being irrelevant. In the other scenario, if the equality is true, then the existing model can be merged with the new content to create a consolidated profile.

As implemented in the invention, the transformation and equality checks are scalable. That is, the equality between derived models (ie, is a Person instance the same as another Person instance) only needs to be defined once. For each model type that acts as a deriving source, defining the transform therefore becomes the only "per-source" activity that must be completed. Subsequent data extracted from the same source can then be treated in a known way.

Figure 5A:
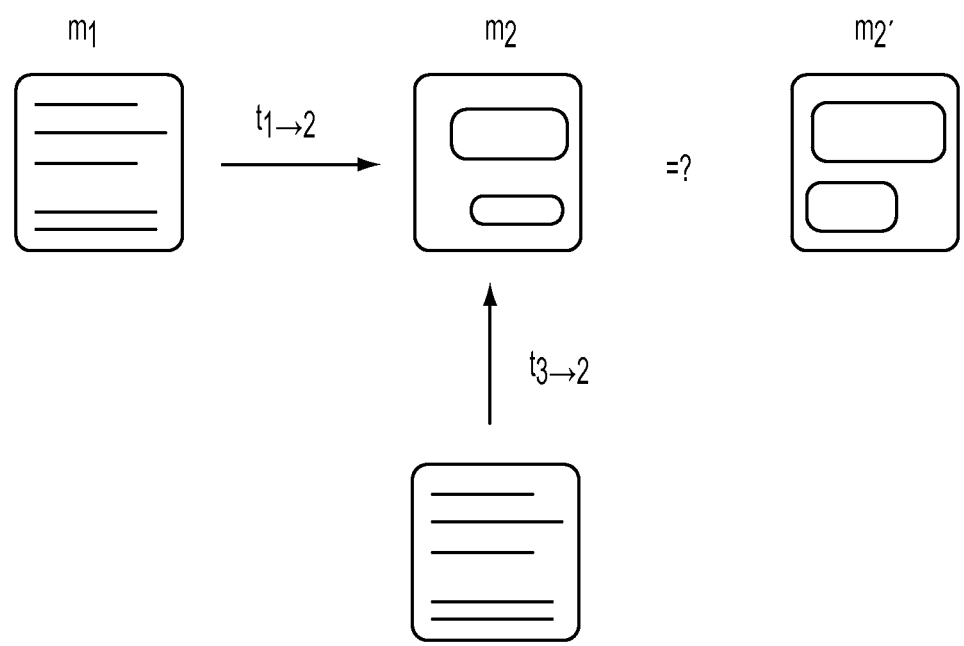
FIG. 5a is a depiction of a model transformation used by the method of FIG. 4.

For a further example, represented in detail in FIG. 5, it is desirable to determine if models of people are both employees and customers. As an example, let us assume there are three models in FIG. 5a—a CustomerPerson model representing customers $M_1$, an EmployeePerson model representing a person from an employee database $M_3$, and a Person model which represents a common model $M_2$. There will be two transformations: from a CustomerPerson to a Person represented as $t_1 \rightarrow t_2$, and an EmployeePerson to a Person represented as $t_3 \rightarrow t_2$. There is an equality for the Person model and check if the model $M_2$ is equal to a model $M_2'$. However, both EmployeePerson and CustomerPerson models can be linked to Person models as well as create new Person models based on both CustomerPerson and EmployeePerson model instances. These evaluations depend upon what features are available in the model. Inequalities may result initially, but subsequent enrichment can give yield to more features, resulting in an equality condition being met.

Once new content is extracted, it can be compared with existing models and attached as appropriate to a consolidated model. The consolidated model is compared with new extracted content. This process is dynamic, and content is continuously extracted and models are made more and more accurate as they are consolidated. Models are thus more informative and there is a greater assurance that the proper content is attached to a model. Transformation between instances of models may be needed because the same person may be modeled in different contexts, ie EmployeePerson and a CustomerPerson, and a transformation or normalization must be defined so these models can be directly compared.

Figure 5B:
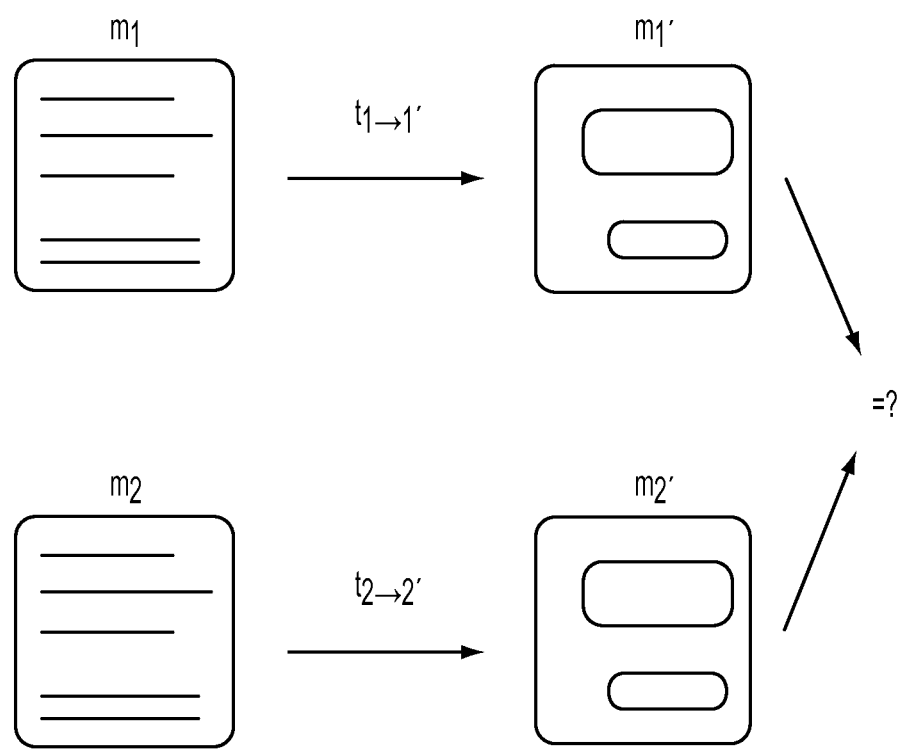
FIG. 5b is a depiction of an alternate model transformation.

In principle, we do not need to transform the second content model to the first. In FIG. 5b, models are transformed to some third common model, for example, both EmployeePerson and CustomerPerson may be transformed to a subset model, ie CorePerson or to a superset model, ie CombinedPerson.

Figure 6:
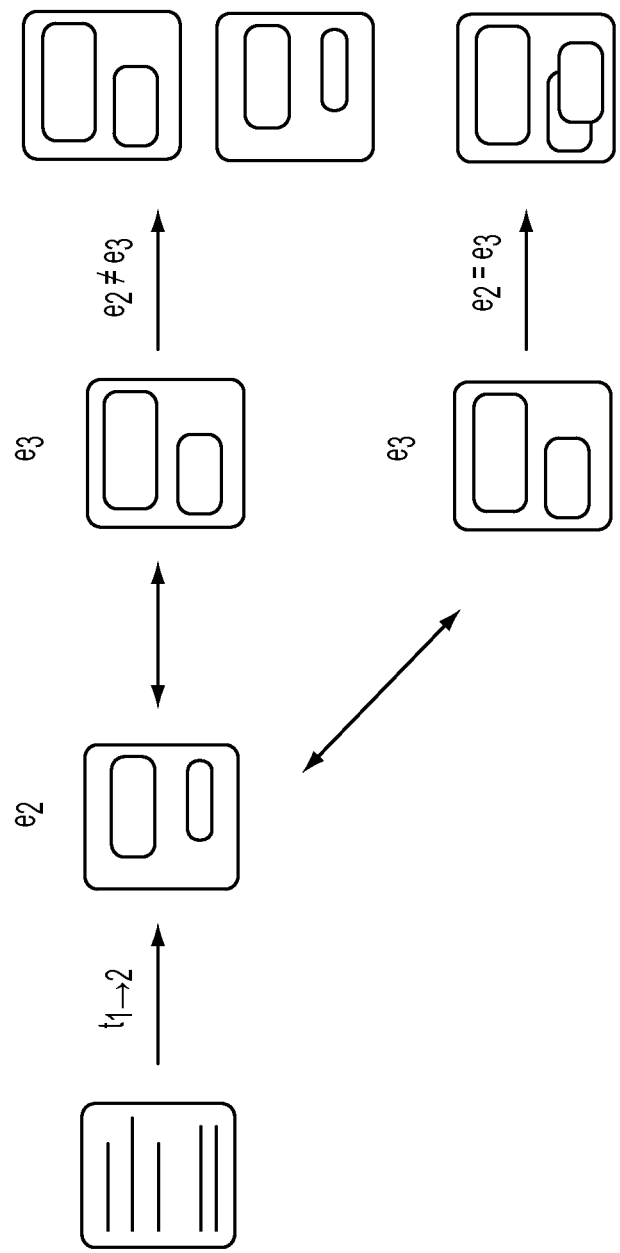
FIG. 6 is a depiction of a content equality determination implemented by the method of FIG. 4.

FIG. 6 shows the process for merging models, that includes carrying out an equality check when the transformation $t_2 \rightarrow t_3$ is applied in attempting to associate content from a model $M_2$ with that of a model $M_3$. As illustrated, content $e_2$ is compared with content $e_3$ to determine if the correspondingly numbered models should be associated. Various rules for determining the equality of content can be applied, with some details discussed below. If content $e_2$ is determined to be equal to content $e_3$, then the models $M_2$ and $M_3$ can be associated, and imported directly into the domain model, for example. If the content is not determined to be equal, then two separate content models remain. Equality in this definition could also refer to an equality of vast amounts of content, or documents as a whole that can be deemed equal for the purposes of associating with the same content model. In some instances, when a determination of equality cannot be made, the two models are maintained until more data is extracted into particular content models and a redetermination can be made as to whether models should be associated.

At the top level, once it is determined which content models can be associated with the domain level, one iteration of the method and method carried out by the system of the invention is complete. Determination of equality can be accomplished in any number of ways, some of which are known in the art, such as a direct comparison of data or by using one of the methods mentioned herein. Due to computing resources available, it is often advantageous, albeit not necessary, for equality characterizations and model associations to be undertaken offline. This is particularly the case when commonly accessed data sources are being used.

An exemplary background process by which model association can be carried out is now described. Given an instance set (which consists of instances of models), it is possible to develop a statistical summary of the instance set. For every property of the model, the range and distribution of the values can be analyzed using the following processes:

1. As a simplification, we can consider only the values of certain types, ie, perhaps only 'simple' types such as times/dates, numbers, and strings. Complex types that are composed of multiple sub-properties may be iterated over or may be treated in a similar manner.

2. Normalize the representation of values for a given type to one or more normalized forms. This normalization process may be specific to a given type, for example, strings may be lowercased. Also, there may be some criteria to determine the optimal normalized form for a type, for example, string values which are short may be treated with little manipulation, whereas strings that are long may be analyzed to remove stopwords (common words in a language) or to introduce stemming or lemmatization. The appropriate normalization may occur upon analysis of the range of values, for example, if the median length is within a certain range, and/or the maximum value is within a certain maximum.

3. The normalized form(s) for each value are then processed using a series of analyzers to determine characteristics of those properties. The characteristics may be specific to the type of value being analyzed; however some properties will generally apply. For example:

(a) All fields: Uniqueness or distribution of data. A property that represents a primary key will be totally unique. A string field that represents a common name.

(b) Numeric and date/time fields: Min/max/mean/median/distribution: specific to different types of data.

(c) String content can be analyzed using similarity distributions.

4. Given the characteristics of the properties, rank each property for its impact on determining the classification of the model, such as by base ranking determination or normalization based on occurrence.

5. Filter out properties based on minimum requirements around a characteristic, minimum scoring (optimization), only the top X features (optimization), minimum occurrences, etc. For example, given the remaining features and characteristics of those features, termed "feature characteristics", we can determine for a given model definition: (a) A weighting of the various features for the equality method, as well as median/mean values to incorporate into equality and similarity analysis; and/or (b) a "fingerprint" for establishing automated translation approaches for best determining how to map fields from one model type to another model type (or to a third common model type), given representative samplings of both model types.

In more complex instances, the extracted content may be entire documents or datasets that cannot readily be distilled into individual pieces of information at the content level. In this instance, a more sophisticated analysis may be necessary, where the equality determination is made on a document level.

Document-Based Similarity

One approach in determining equality for association, or similarity, evolves from information retrieval similarity measures developed for document analysis, i.e., tasks like "show me documents that are similar to this document".

Documents can be modeled in different ways. Suppose we are going to use the approach that each term is a dimension in a given data space and a document is then a vector with values in each dimension. If one has a corpus with N documents its representation will be: $D=\{d_1, \ldots, d_N\}$. It is also possible to add structural approaches, and to introduce other metrics, like distance between words, for example.

Let's define $T=\{t_1, \ldots, t_p\}$ to be a set of important terms. In standard document analytics, important terms might be considered descriptive ones obtained after filtering for stop words like a, and, do, etc. In our context, important terms may be the terms that exist in the model space.

In general a document d can be represented as a p-dimensional vector:

$$\vec{t}_d = (tfidf(d, t_1), \ldots, tfidf(d, t_p)) \quad (0)$$

where the tfidf term multiplies the frequency of a term in a document to a weighting factor which takes into account its importance in the corpus of documents.

$$tfidf(d, t) = tf(d, t) \times \log\left(\frac{|D|}{df(t)}\right) \quad (1)$$

where tf(d,t) is the term frequency of the term t in the document d, df(t) is the number of documents where the term t appears and |D| is the cardinality of D. Let's call the term tfidf(d,t) as $v_{t,d}$ for simplicity.

In order to determine if two or more documents are close to each other in terms of content, one needs to define a similarity measure. In general, the similarity measures map the similarity between two documents in a numerical value. There are different similarity measures used in the literature for example the Euclidean Distance, the Cosine Similarity, the Jaccard Coefficient, the Pearson Correlation Coefficient and the Averaged Kullback-Leibler Divergence. Let's describe as examples some of them in more details. The characteristics of the other measures can be found in literature.

The Euclidean distance is widely used in clustering problems. It measures the standard geometrical distance between two points, in this case two documents, lest call them document $d_a$ and document $d_b$, so:

$$D_E(\vec{t}_a, \vec{t}_b) = \sqrt{\Sigma_{t=1}^{P} |v_{t,a} - v_{t,b}|^2} \quad (2)$$

where t runs over the set of important terms T and $v_{t,a}$ and $v_{t,b}$ are evaluated as described previously.

In the case of the Cosine Similarity measure which is one of the most popular measures applied to text documents, one computes it as:

$$CosS(\vec{t}_a, \vec{t}_b) = \frac{\vec{t}_a \cdot \vec{t}_b}{|\vec{t}_a| \times |\vec{t}_b|} \quad (3)$$

Again $\vec{t}_a$ and $\vec{t}_b$ are m-dimensional vectors. In general the CosS is not negative and takes values in [0,1]. The value 1 will result from identical documents; less similar documents will result in values closer to 0.

The Jaccard Coefficient compares the sum weight of shared terms to the sum weight of terms that are present in either of the two documents but are not the shared terms:

$$CosJacc(\vec{t}_a, \vec{t}_b) = \frac{\vec{t}_a \cdot \vec{t}_b}{|\vec{t}_a|^2 + |\vec{t}_b|^2 - \vec{t}_a \cdot \vec{t}_b} \quad (4)$$

The Jaccard Coefficient ranges from 0 to 1. It is 1 when $\vec{t}_a = \vec{t}_b$ and 0 when the vectors are completely different.

The measures are better suitable when dealing with rather large documents where the descriptive terms appear several times and a better comparison between the documents can be done based on the term frequencies tf and df.

Similarity of Models and Content

Often models may be associated with content without a specific transform defined to transform the content type to the model type. In this case the models still may be associated to the content. For example, a "Person" model might be associated with news articles which mention the person. In this case, the platform allows definition of different features which can be used to evaluate the content to determine if it references the model.

These evaluations may depend upon what features are available in the model. A lack of features may result initially in the lack of enough information to link a model with content, and then subsequent enrichment may give yield to more features that then result in a linking condition being met.

In the described process, suppose we are building models of objects like companies, properties and people. The models can be considered a very concise and structured database of important terms defining the objects. The models can be translated into documents, in this sense we can define $M=\{m_1, \ldots, m_N\}$ to be a space of all models generated by our software. Now, given a corpus D of documents like the one used before (news articles, blogs etc) one can find associations between documents in space M and D. In more details one will be associating news, articles etc, found in the web (or corpus) to documents representing model of objects built by OIQ. Using this method we would be able to process big data problems of matching related content in a methodological way.

We are going to build a vector T based on all the important terms found in all model documents. The models are going to be converted in vectors of the form $\vec{m} = (tfidf(t_1), \ldots, tfidf(t_p))$. For a given model m, the document vector will be formed by the important terms found in this model and the rest of components are going to be zeros.

The method can be a scalable one, using first the models originally built in the software; one can run the document association method and attach documents with high degree of similarity first, in this way we can enrich our models including the information in the documents attached. Then we can proceed and rebuild the model's vectors and continue with the document association method with an improved set of information. This procedure can continue until no more documents are associated or other stopping methods can be also used.

When using the models before enrichment we need to find for example all the documents in D associated to a given model instance m. In this case, the important set of terms T will be the same of those found in the model m, T=m= $\{t_1, \ldots, t_p\}$. We convert the model in a document vector as described before and then we need to apply a similarity measure running through all documents in D. There are important differences between the cases of using the similarity measures in long documents with several hits for every term and the case we are presenting here, where the important terms within the model m are very likely to be all tf=1 and not so many terms. The model vector without the normalizing factor will have in general the form T=m={1, 0, ..., 1}. When analyzing a small number of key terms we are going to find many cases where a vector document will be d={0, ..., 0} when no match is found to the given model. The similarity measures presented above cannot deal directly with such specific problems. In addition, in our case if we find an important term in a model m (where appears once) many times in a document d then the distance in similarity will be larger (for example the Euclidean Distance) and the Cosine Similarity is smaller indicating less similarity which is the opposite trend as we would like to obtain. Finding more hits of an important term in m in document d means the document is more likely to be related to the model.

Some adaptations should be made to the similarity measures for our specific problem. The Cosine Similarity may not be so appropriate for our purposes since we will be dealing with several cases where $|\vec{d}|=0$ and indefinite cosine will be returned. Also consider the case when more terms above 1 are found in the document, the larger the dissimilarity will be. We can use the Euclidean Distance measure:

$$D_E(\vec{t_a}, \vec{t_b}) = \sqrt{\sum_{t=1}^{p} \left\{ \log\left(\frac{|D|}{df(t)}\right) [tf(t, a) - tf(t, b)] \right\}^2} \quad (5)$$

where it is assumed that there is a document space D and we are comparing documents a and b from D. In this case the normalization factor for both documents is log [|D|/df(t)]. In our case we have two spaces defined, the space of the models M and the space of the documents D. We can take all the normalization factors in D+M or in D. In our case we are going to use D for simplicity considering the space is big enough so there will be almost no difference in the values of |D|/df(t) and |D+M|/df(t).

A regular Euclidean Distance measure is not ideal for similarity measures in many cases. In one case, for example, when one important term is found in document 1 and not found in model 2, the distance measure will result in $((1-0)*df(t))^2$, the same as finding 2 times the same term in model 2, $((1-2)*df(t))^2$. Also, for our purposes if a term of a model is found in a model more than once we expect that the similarity would increase, instead, the Euclidean measure behaves opposite since the difference (tf(t,a)−tf(t,b)) is considered.

We can adapt the Euclidean distance to our purposes and write it as:

$$D_E(\vec{t_a}, \vec{t_b}) = \sqrt{\sum_{t=1}^{p} \left\{ \log\left(\frac{|D|}{df(t)}\right) \times O[tf(t, a)] \times tf(t, b) \right\}^2} \quad (6)$$

where almost all models have tf(t,a)=1 for the important terms concerning them and zero for the rest and O[tf(t,a)] is the step function defined as:

$$O[tf(t, a)] = \begin{cases} 0, & tf(t, a) = 0 \\ 1, & tf(t, a) > 0 \end{cases} \quad (7)$$

In this measure of distance larger values will occur for more similarity. The sum is taken through all important terms. In this measure only the values where the condition tf(t,a)≠0 is satisfied will contribute to the measure. In the case of a document with important terms outside the ones of the given model m these values will not contribute to the measure (it could in principle contribute in a negative way).

We could include the effects of values where tf(t,a)=0 but the document has the important term (which belongs to another model) as a negative measure. We must modify the similarity distance:

$$D_E(\vec{t_a}, \vec{t_b}) = \qquad (8)$$
$$\sum_{t=1}^{p} \left\{ \frac{2 \cdot tf(t, a) - 1}{|2 \cdot tf(t, a) - 1|} \times \log\left(\frac{|D|}{df(t)}\right) \times tf(t, a) \times tf(t, b) \right\}$$

Larger distances correspond to larger similarities. The sum can be taken through all important terms in every document. Hits of important terms in both the model and the document will increase the distance; a hit in the document which is not in the model contributes in a negative way. The square was removed in order to account for the negative contributions. Negative distances are then allowed in this case disregarding the metrics.

We can also use the Jaccard Coefficient as a similarity measure as presented before using the scalar product and modulus of a vector as:

$$\vec{t_a} \cdot \vec{t_b} = \sum_{t=1}^{p} \left\{ \left[\log\left(\frac{|D|}{df(t)}\right)\right]^2 \times tf(t, a) \times tf(t, b) \right\} \quad (9)$$

$$|\vec{t_a}|^2 = \sum_{t=1}^{p} \left\{ \left[\log\left(\frac{|D|}{df(t)}\right)\right]^2 \times tf(t, a)^2 \right\} \quad (10)$$

The Jaccard similarity measure also takes into account the terms that do not coincide in both vectors as negative impact to the similarity measure.

We can comparatively use the above discussed similarity measures. Similar documents above a certain distance threshold limit from D can be attached to models in M. The thresholds in the similarity measures for document association must be explored in testing cases, as well as the robustness of the method.

Classical similarity analysis uses the concept of terms matching or being equivalent. However, in many scenarios, for any term, there can exist a type to that term (as preserved in a model type, and/or as derived from text). For example, a date may be present in many forms in text, but it can be normalized to a single form. In addition, if the terms are not completely equivalent, they may still be similar, depending upon the type. For example, a company may be given a location where it is headquartered, and in a news article it may talk about this location or another nearby location. Even in the nearby location, it may be a hint that the article should be associated to the company.

In such cases, we can extend the definition of "term" in the equations above to not just consider text types but also other types. Examples of similarity term types used in the system include: Geocoded similarity (or address similarity), text similarity, numerical similarity, and date similarity. In these cases, a term score may not be zero if it is similar to a term in the compared document or model. As an example, two dates may be "close" which may give a non-zero score.

The above discussion may assume that the content terms are established for the entire content or document but segmentation can also be employed, performing the similarity over segments. These segments may be windowed and may or may not overlap (for example, with a sliding window algorithm). These segments could also be focused around key attributes that are being compared in the model space, for example, a company name or a person name. For example, even a simple paragraph by paragraph approach may reduce noise in some contexts. In such a scenario, a document is reduced to a series of paragraphs each of which is scored independently against a model space. These scores can either be added or the highest score can be used for the basis of merging, depending upon the scenario. For example, merging news references to companies, it may be sufficient that the company appears once in the news document, or it may be a requirement that the company is the major topic of the news article.

Alternatively to windowing/segmentation, a distance decay function can also be applied, such that terms close to other model terms have a stronger correlation. As an example, if a company name and address appear closer together, they may receive a stronger similarity score than for a document in which the company name and address appear in the same document but further apart.

Similarity of Models in Equivalent Model Spaces

Another advantage from the content association method described before is the possibility to use it to determine identical models in the model space M (or when the model(s) can be translated such that they are mapped to the same model space). In this sense we can clean up the models data base and assure to have one model for each company, person or property.

Any of the similarity measures described above could be used for this purpose. The cardinality of the space now will be M and the df(t) values have to be extracted from the models space. For this purpose we need to build the corpus of the models with the information we have for each company so we can get the df(t) values. The similarity distance between $m_a$ and $m_b$ using the measure of eq 6 can be written as:

$$D_E(\vec{m_a}, \vec{m_b}) = \sqrt{\sum_{t=1}^{P} \left\{ \log\left(\frac{|M|}{df(t)}\right) \times O[tf(t, m_a)] \times tf(t, m_b) \right\}^2} \quad (11)$$

Using the similarity measure from eq 8:

$$D_E(\vec{m_a}, \vec{m_b}) = \sum_{t=1}^{P} \left\{ \frac{2 \cdot tf(t, m_a) - 1}{|2 \cdot tf(t, m_a) - 1|} \times \log\left(\frac{|M|}{df(t)}\right) \times tf(t, m_b) \right\} \quad (12)$$

The Jaccard similarity measure can also be used for this purpose.

Similarity Analysis with Machine Learning

Various approaches can be used to determine the thresholds for identical matches. In one approach, a training set can be used to establish an optimized threshold score. Alternatively, this threshold can be set manually, or even always be associated including the score such that an end-user could see the score and make their own assessment.

Other approaches are also possible for the analysis, including both manual and automated approaches. For example, an identifier attribute or set of attributes may be specified as part of the model that are required to exist in the merging term space (or some minimum are required to exist). This approach can allow for a manual determination of a "fingerprint".

A combination of approaches can also be used, whereby identified attributes are required, in addition to a similarity analysis with a strong similarity score. Weights for the various model attributes can also be learned using machine learning techniques. These may lead to some non-obvious results. For example, some model attributes, may have more than one value, for example, a person's previous employers, or may have a singular value, such as current address, and manually merging two records, there might be a temptation to focus on the current address field. However, people may move or actually have several current addresses, so even if the model has a single attribute for current address, it may not be strongly correlated when determining if two entries in two models in fact refer to the same individual.

In one embodiment, if we assemble a set of documents and translate them into document models with attributes, these attributes then become candidate features for inclusion in our model space to establish the features for best-fit analysis. The task at hand becomes a problem of feature selection. In one embodiment, inductive learning is used, whereby the merging is established by feature selection to provide constraints followed by the creation of a merging model algorithm that optimizes the merging of data given those constraints. In one embodiment, information-gain algorithm is used. Dependence maximization, hill-climbing algorithmic approaches, etc, can also be used to determine the optimal candidate features and relative weightings.

Given the relative weightings of the importance of vector terms, these can be incorporated into the similarity analysis equations 8, 10, and 12.

Model Merging, Incorporation and Adaptation

While model similarity and association has been discussed in much detail above, it has heretofore been unexplained as to how content models are associated with the domain model. This can be done by model merging as described below. In addition, the model merging can be carried out to merge different content models prior to incorporation into the domain model.

When merging models, there may exist multiple sources for a given attribute. It may be desirable to determine the 'best attribute', where 'best' may be defined as most reliable, or most likely to be accurate, or some other definition depending upon the use case.

For example, suppose a Company model is being created from two sources, CompanySource1 and CompanySource2, both of which have revenues for the company for the current year, but the two sources might have different revenue estimations.

Determining the appropriate content can be performed using a number of different strategies, including defined and automated approaches.

A defined approach may involve setting an attribute based on a user-defined preference for the given underlying source (for example, having one source preferred by a user).

An automated approach may be determined using various statistical or machine learning approaches. For example, a decision tree may be used to select the appropriate value, possibly based on a repository of actual values or other training set. For example, a set of Company instances based on actual revenue values may be compared to various sources' revenue values to determine what sources are more accurate.

The merged value may alternatively not be selected from a discrete value of a contributing model. Instead, for example, an average of contributing values may be used, or a weighted average that weights the source based on some measure (such as a trust measure).

Multivariate regression models may also be used to determine the appropriate numeric values given one or more data sources. A model tree approach can also be used across a number of contributing models to determine the appropriate value based on other attributes in the model. For example, in the Company model, the appropriate revenue number may be determined by different weightings of various sources depending upon the size of the company or if the company is private or public, in which case different attributes may be utilized in a decision tree to determine the appropriate linear equation.

Optimization of Merging

Merging models and/or attaching content can impact future outcomes if it impacts the scoring for future content (for example, by impacting the term space in the similarity analysis). Not only can the merging be computationally intensive, the process may also impact quality. Given an instance of a large model with only a few seed attributes (such as a person's name) and unknown attributes that can be incorporated from merged models, a question of the ordering or best-fitting of those features can become significant. In such a scenario, going "down the wrong path" and merging incorrect models early in the process can lead to incorrect attributes and also prevent correct content from being incorporated. For example, mistaking one person's medical record for another would then give the wrong person potentially the wrong illnesses.

Under one approach in this invention, the merging of models and content can be performed most accurately by scoring a collection of content or models, and then merging the highest scoring models and then repeating. This can be computationally intensive and may be optimized. In one optimization, for example, some content may be merged in a specific order.

In one optimization, in approaches where the content is iteratively analyzed and fetched, this can offer clues that the content is no longer appropriate and the pattern of content discovery and analysis can be halted in that document space. For example, if a collection of web pages is being analyzed from a site and is not being merged to a model instance, it may not make sense to crawl and/or analyze subsequent pages that are attached to those pages.

In another approach, the crawl depth may be determined by the success in previous model instances against that source.

In an alternative embodiment, a set order may be determined and/or an optimized order is developed over time by learning "trusted sources", for example, that one source seems to generally be a more reliable or closer fit.

In another approach, content possibly pertaining to the model is cached locally and reanalyzed during the merging process such that content which was not matching initially due to a lack of attributes attached to the model may at a later point in time be attached.

Neural networks, cluster models, hidden Markov models, Bayesian networks, or other machine learning methods can also be used to classify or create clusters for further analysis, potentially optimizing the best-fitting algorithms, performing the calculations on a subset of documents or acting as a replacement or first-pass against large sets of documents. Alternatively creating decision tress or other path optimization approaches can be used.

Due to the many degrees of freedom involved, in one embodiment a modified Monte Carlo Tree Search (MCTS) is employed to combat such potential issues without iterating through all possible combinations of merged content. In such an approach:

1. Start with the seed model. Randomly or via an evaluation criteria (for example, a random-seed weighted similarity analysis), evaluate the next model instances to merge.
2. Score the merge based on one of the similarity algorithms discussed and add it to the model's overall score.
3. Continue step 2 until no appropriate additional models are appropriate to merge, use the results of that simulated merge to update the model merge scores of those merged.
4. Return to step number 1, and select another model instance to merge.

The net effect, over the course of many simulated merging simulations, is that the value of each merged model will go up or down, corresponding to whether or not that model represents a good fit. An optimal set of merged models should emerge. In a final pass, merge the models in order of score, reassessing their similarity score prior to merging. A good scoring model may not be a good fit in this optimal scenario, thus the secondary check of similarity scores prior to merging for the final result.

In one embodiment, previous scoring of content sources is established via historical regression or inductive learning approaches, scoring not just the attributes but also the sources, and high scoring sources are used in two possible regards: a) given a weighted boost according to such historical scoring and/or b) establishing "tiers" and repeating the Monte Carlo testing with sets of data, starting with higher correlated/trusted sources, then relaxing in the next tier to other sources (or less structured sources) and repeating, beginning the next tiered extraction from the enriched model output from the previous stage.

Various domains are particularly attractive for the application of the invention, including domains such as insurance, investing and securities, credit and banking, fraud, healthcare, and applications involving due diligence with disparate data from different sources and ranging from structured to unstructured information.

One application combines an insurance model with the invention to determine at individuals, companies, properties or vehicles to create a consolidated view and determine relevant information for underwriting a risk or determining if a claim is potentially fraudulent.

Another application combines a credit model with the invention to facilitate determine credit for a company or person by combining multiple sources to create a "best-fit" view of the candidate.

EXAMPLE

FIG. 7 is a screenshot of a merged model from several data sources. An end state is shown whereby an example CompanyLiability model has been populated by several sources. In this view of the populated CompanyLiability model, different sources have a revenue attribute for the specific company being analyzed. In this case, an average of the different values is displayed as the company's revenue number. However, in this system, the best-fit value may be calculated using more sophisticated approaches, such as one source being selected as most reliable or a regression approach combining multiple sources.

As an example, we will begin to build such a merged model as an end state. In this example, we will be using a tiered approach to building the profile, with tiers demarcated based on the degree of structure of the sources. As input, we might receive some basic information about a company, such as the name of the company and an address the company operates. Translating that information into a seed CompanyLiability model, the system performs queries and brings back information from multiple sources that may represent information about the company. The sources we query may be determined by historical success or may be, in the simplest case, manually specified.

After querying these initial sources, let us assume we are building a consolidated CompanyLiability profile from five different representations/sources of company models. These company representations are structured into intermediate models with attributes. In this case, all five models represent or can be translated into a company model with loosely matching names. Assuming these five models are created, we may have some with different addresses for the company. These may, in fact, represent several companies, or a company with multiple locations, or some combination thereof.

We apply the similarity test against these populated models, first by translating each into CompanyLiability models and comparing against the seed model. Using an MCTS approach (or with just 5 models, iterating through each combination of merge), we arrive at an optimal model that has combined 0-5 of the models retrieved from our initial queries. In this case, the system may have discovered two profiles that match the name and address, one of which also lists a secondary location. Another profile might list the name with same address as the secondary location of one of the first profiles, and these end up being the merged set. They also may contain phone records or other information that merges together to create this best fit state. The remaining two profiles, while matching the company name, have different locations, owners, etc and are likely determined to be other entities, and are not merged.

At this point, one of the records that was merged also indicates that the company uses an alternative name (DBA name). They system then may re-query previously queried sources and/or new sources to search for records under that alternative name. This process, in this example, returns an additional record, is translated to a CompanyLiability model, and is found through the similarity process to be equivalent and merged. The other profiles may also be re-evaluated, to determine if any other changes (merging or unmerging of previous profiles) should take place.

At this point, employing a tiered approach, the system queries various other sources for additional records/documents that may refer to the entity being analyzed. In this example, consider one thousand additional documents that were discovered and were translated into models understandable by the system. For example, these documents may be news articles. Some of them may contain addresses or locations in a news article text, but can't necessarily be translated directly into CompanyLiability models. Using NLP or other approaches, some structured information may be extractable and a semi-structured model may be possible to be generated. Depending upon the degree of structure, a similarity analysis comparing the document or model may be performed.

Some of the analyzed contents may score sufficiently to be attached or merged to the CompanyLiability model as an associated content model. In this example using tiering, some of those matching documents may contain other links and they may also be retrieved and further analyzed. In some cases, some structured or translated information may also be incorporated into the CompanyLiabillty model, for example, an owner of the company might be extracted from a news article. Other documents that did not match sufficiently, in this example, are not merged and any links that those documents referenced to other documents are not pursued. In this example, with the tiered approach, previous decisions were not reanalyzed, but a merge that does bring in new information, such as the owner of the company, may in fact, in a different example, require that previous decisions to merge content and models to be re-evaluated.

At some point, the system may stop analyzing additional content and the resulting merged/populated CompanyLiability model is considered complete. In this example, an underwriter may then be responsible for analyzing the populated model to determine credit or insurance rates, or alternatively the populated model may be used with predictive analytics to determine the rating of the company under consideration.

The above-described embodiments are intended to be examples of the present invention and alterations and modifications may be effected thereto, by those of skill in the art, without departing from the scope of the invention, which is defined solely by the claims appended hereto.

What is claimed is:

1. A method for content extraction and modeling by a computer system for incorporating the content into a domain model, the method comprising:

extracting, by an acquisition module, content stored on a computer readable medium of at least one data source;

determining whether said content is structured or unstructured; wherein structured content has a first content model associated therewith defining at least a format of said structured content and unstructured content has no model associated therewith;

upon a condition in which said content is structured, incorporating said structured content into said domain model;

upon a condition in which said content is unstructured, determining by said computer system a second content model to transform said unstructured content into newly structured content, transforming said unstructured data into newly structured content, storing by said computer system said second content model, and incorporating said newly structured content into said domain model;

extracting by said acquisition module additional content;

determining an equality of said additional content and said domain model for determining whether said additional content is relevant to said domain model, said determining comprising:

developing a statistical summary of said domain model and said additional content;

determining a similarity measure from said statistical summary and identifying a minimum score of said similarity measure required to identify said equality; and determining said equality if said minimum score is met; and upon determining said equality, incorporating said additional content into said domain model.

2. The method according to claim 1, further comprising:
prior to determining an equality of said additional content and said domain model, determining whether said additional content is structured or unstructured;

upon a condition in which said additional content is unstructured, determining whether said unstructured additional content can be structured by said second content model;

upon a condition in which said unstructured additional content can be structured by said second content model, incorporating said additional content into said domain model.

3. The method according to claim 2, further comprising repeating each of said steps until an additional content limit has been reached.

4. The method according to claim 3, further comprising repeating each of said steps with multiple content models with the order of merging determined by a merging weighting.

5. The method of claim 4, further comprising repeating each of said steps with multiple content models and then repeating with additional content models where such cycles are determined by a source weighting.

6. The method of claim 5, where the source weighting includes a weighting component based on the amount of structure of the source content.

7. The method according to claim 2, wherein said incorporating into said domain model comprises applying a transform to one or both of said first content model and said second content model.

8. The method according to claim 2, wherein said incorporating into said domain model comprises applying a transform to said second content model such that said second content model can be incorporated into said first content model and subsequently applying a second transform to said first content model to incorporate said first content model into said domain model.

9. The method according to claim 1, further comprising, upon failing to determine said equality, extracting further additional content.

10. The method according to claim 1, wherein upon being unable to determine whether said additional content is relevant, storing on a computer readable medium said additional content for further analysis.

11. The method according to claim 1, wherein said determining whether said additional content is relevant comprises determining, an association of said additional content with said known content in said domain model.

12. The method according to claim 11, wherein said determining an association comprises identifying at least a portion of said content model which can be incorporated into said domain model.

13. The method according to claim 1, wherein said additional content includes a document, and said similarity measure is determined based on said document.

14. The method according to claim 1, wherein said determining an equality of additional content comprises determining an equality of said content model with at least a portion of said domain model.

15. The method according to claim 1, wherein the similarity measure uses an inductive learning.

16. The method of claim 1, wherein developing a statistical summary of said domain model comprises:

generating a normalized representation of the data; and
processing the normalized representation of the data to determine important characteristics of the data.

17. The method of claim 16, wherein determining a similarity measure from said statistical summary comprises:
generating vector representations of the domain model and the additional data for the important characteristics of the domain model, and
comparing the vector representations to determine the similarity measure.

18. A computer system for content extraction and modeling for incorporating the content into a domain model, the computer system comprising:
an acquisition module implemented on said computer system for extracting content stored on a computer readable medium of at least one data source;
a discovery module implemented on said computer system for determining whether said content is structured or unstructured; wherein structured content has a first content model associated therewith defining at least a format of said structured content and unstructured content has no model associated therewith;
upon a condition in which said content is structured, incorporating said structured content into said domain model; and,
upon a condition in which said content is unstructured, determining by said computer system a second content model to transform said unstructured content into newly structured content, transforming said unstructured data into newly structured content, and incorporating said newly structured content into said domain model;
a computer readable medium for storing said second content model;
said acquisition module further including computer executable instructions for extracting additional content;
said computer system further including computer executable instructions for:
determining an equality of said additional content and said domain model for determining whether said additional content is relevant to said domain model, said determining comprising:
developing a statistical summary of said domain model and said additional content;
determining a similarity measure from said statistical summary and identifying a minimum score of said similarity measure required to identify said equality; and
determining said equality if said minimum score is met; and
upon determining said equality, incorporating said additional content into said domain model.

19. The system according to claim 18, further comprising:
said discovery module including computer executable instructions for, prior to said computer system determining an equality of said additional content and said domain model, determining whether said additional content is structured or unstructured;
upon a condition in which said additional content is unstructured, said discovery module determining whether said unstructured additional content can be structured by said second content model;
upon a condition in which said unstructured additional content can be structured by said second content model, said discovery module incorporating said additional content into said domain model.

20. The system according to claim 19, further comprising computer executable instructions on said computer system for repeating each of said steps until an additional content limit has been reached.

21. The system according to claim 19, wherein said incorporating into said domain model comprises applying a transform to one or both of said first content model and said second content model.

22. The system according to claim 19, wherein said incorporating into said domain model comprises applying a transform to said second content model such that said second content model can be incorporated into said first content model and subsequently applying a second transform to said first content model to incorporate said first content model into said domain model.

23. The system according to claim 18, further comprising computer executable instructions on said computer system for:
upon failing to determine said equality, extracting further additional content.

24. The system according to claim 18, wherein upon being unable to determine whether said additional content is relevant, storing on a computer readable medium said additional content for further analysis.

25. The system according to claim 18, wherein said determining whether said additional content is relevant comprises determining by said computer system an association of said additional content with said known content in said domain model.

26. The system according to claim 25, wherein said determining an association comprises identifying at least a portion of said content model which can be incorporated into said domain model.

27. The system of claim 25, where the domain model is used for one or more of insurance underwriting, assessing possible fraudulent activity and credit decisioning.

28. The system according to claim 18, wherein said additional content includes a document, and said similarity measure is determined based on said document as a whole.

29. The system according to claim 18, wherein said determining an equality of additional content comprises determining an equality of said content model with at least a portion of said domain model.

30. The system of claim 18, wherein developing a statistical summary of said domain model comprises:
generating a normalized representation of the data; and
processing the normalized representation of the data to determine important characteristics of the data.

31. The system of claim 30, wherein determining a similarity measure from said statistical summary comprises:
generating vector representations of the domain model and the additional data for the important characteristics of the domain model, and
comparing the vector representations to determine the similarity measure.

* * * * *